US012606128B2

(12) United States Patent
Yoon et al.

(10) Patent No.: US 12,606,128 B2
(45) Date of Patent: Apr. 21, 2026

(54) SENSOR CLEANING SYSTEM

(71) Applicants:Hyundai Motor Company, Seoul (KR); Kia Corporation, Seoul (KR); DY AUTO Corporation, Asan-si (KR)

(72) Inventors: Hyun Woo Yoon, Hwaseong-si (KR); Ik Hoon Kim, Seoul (KR); Sang Jun Ahn, Incheon (KR); Sung Min Yang, Incheon (KR); Won Seop Choi, Anyang-si (KR); Hyong Do Chung, Anyang-si (KR); Seong Jun Kim, Asan-si (KR); Sin Won Kang, Asan-si (KR)

(73) Assignees: Hyundai Motor Company, Seoul (KR); Kia Corporation, Seoul (KR); DY Auto Corporation, Asan-si (KR)

( * ) Notice: Subject to any disclaimer, the term of this patent is extended or adjusted under 35 U.S.C. 154(b) by 348 days.

(21) Appl. No.: 18/243,821

(22) Filed: Sep. 8, 2023

(65) Prior Publication Data

US 2024/0308477 A1     Sep. 19, 2024

(30) Foreign Application Priority Data

Mar. 16, 2023     (KR) ........................ 10-2023-0034442

(51) Int. Cl.
*B60S 1/56* (2006.01)
*B60S 1/48* (2006.01)
*B60S 1/54* (2006.01)
*B60W 40/02* (2006.01)

(52) U.S. Cl.
CPC ................. *B60S 1/56* (2013.01); *B60S 1/481* (2013.01); *B60S 1/54* (2013.01); *B60W 40/02* (2013.01)

(58) Field of Classification Search
None
See application file for complete search history.

(56) References Cited

U.S. PATENT DOCUMENTS

| | | | | |
|---|---|---|---|---|
| 2021/0370885 | A1* | 12/2021 | Dingli | ....................... B08B 5/02 |
| 2022/0032878 | A1* | 2/2022 | Shawgo | .................... B60S 1/54 |
| 2022/0176915 | A1* | 6/2022 | Santoyo Martinez | .. B60S 1/546 |
| 2024/0149923 | A1* | 5/2024 | Fang | ....................... G06V 20/56 |

FOREIGN PATENT DOCUMENTS

| | | | |
|---|---|---|---|
| JP | 6846346 | B2 | 3/2021 |
| KR | 10-2022-0053388 | A | 4/2022 |

* cited by examiner

*Primary Examiner* — Richard H Kim
(74) *Attorney, Agent, or Firm* — Morgan Lewis & Bockius LLP

(57) ABSTRACT

A method of controlling the sensor cleaning system includes detecting contamination of an environmental sensor, determining a contamination source of the contamination when contamination of the environmental sensor is detected, and adjusting operation of an air cleaning system of the sensor cleaning system based on the determined contamination source.

19 Claims, 6 Drawing Sheets

| | |
|---|---|
| ——► | Compressed air flow |
| - - -► | Communication signal flow |
| -·-·-► | Washer fluid flow |

FIG. 7

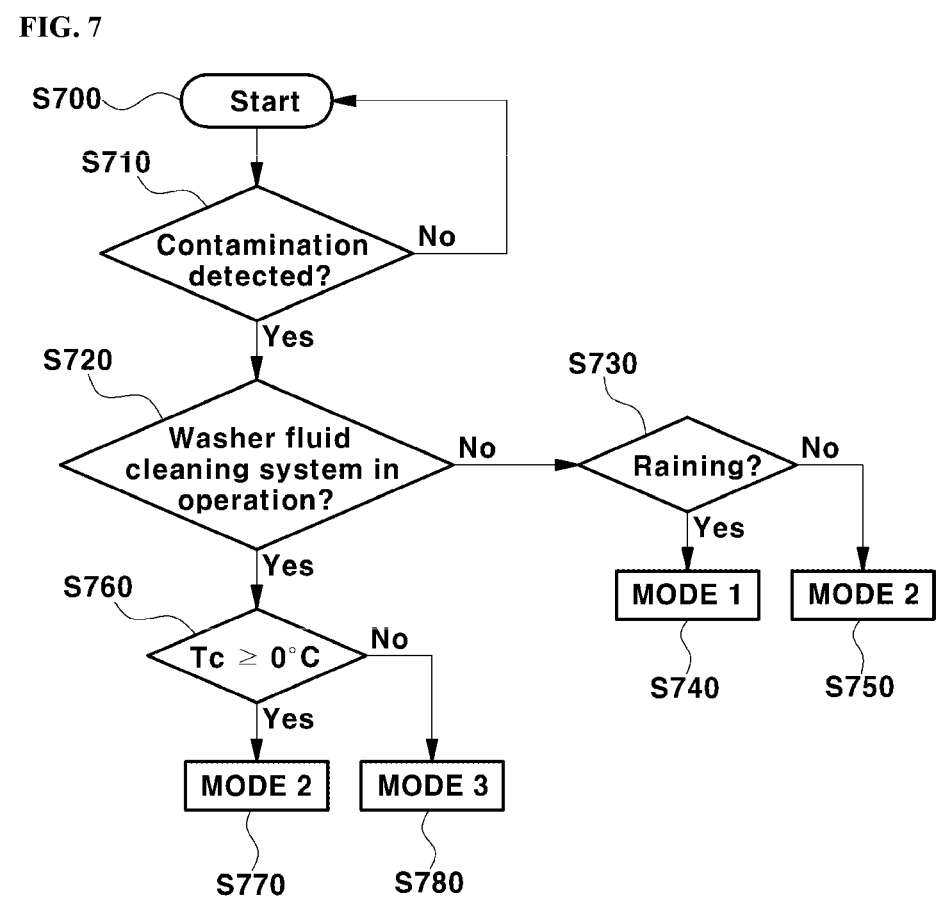

S700 — Start

S710 — Contamination detected? — No

Yes

S720 — Washer fluid cleaning system in operation? — No — S730 — Raining? — No

Yes — MODE 1 — S740

No — MODE 2 — S750

Yes

S760 — Tc ≥ 0°C — No

Yes — MODE 2 — S770

MODE 3 — S780

FIG. 9

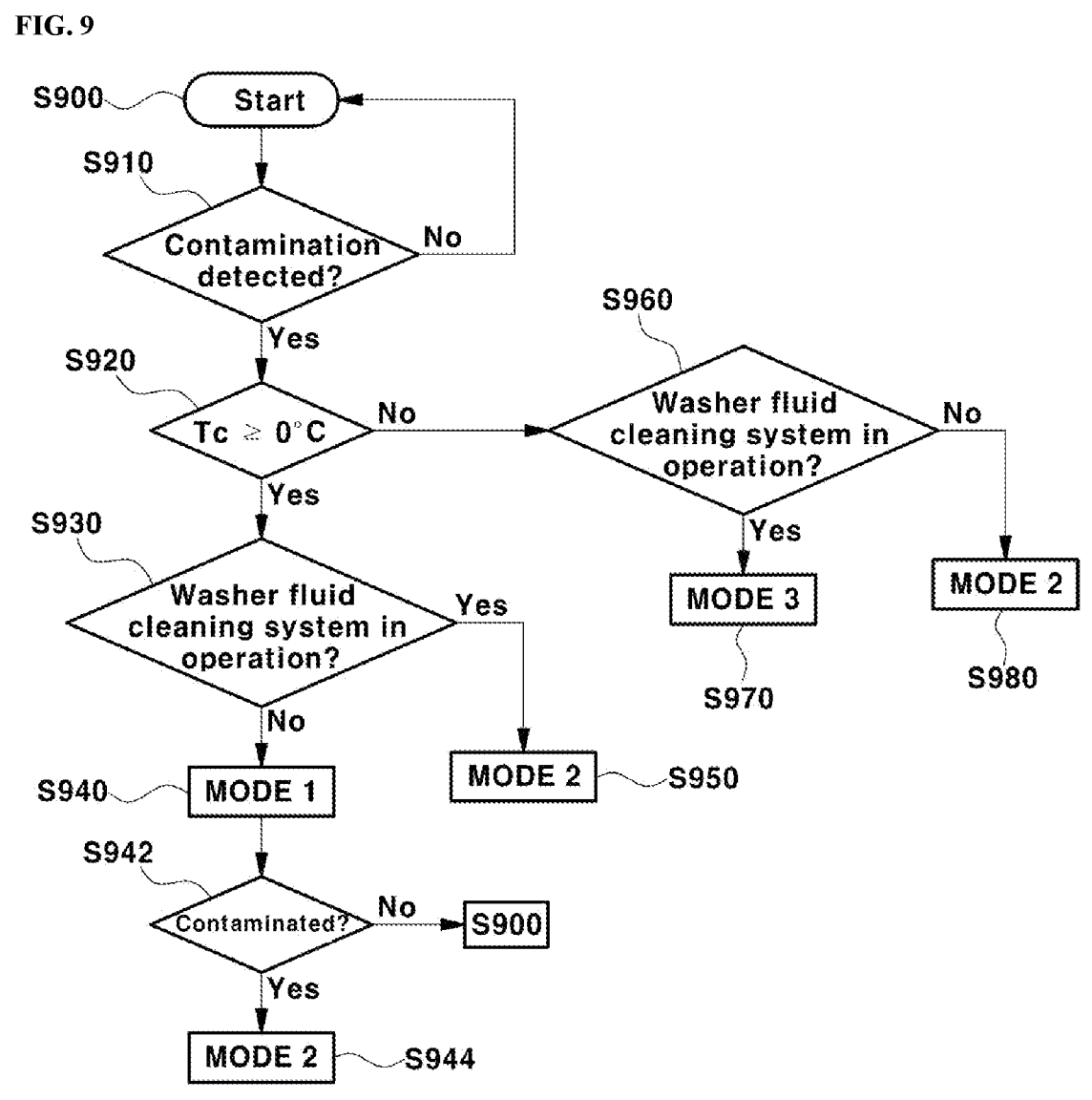

S900 — Start

S910 → Contamination detected? — No

Yes

S920 → $Tc \geq 0^{\circ}C$ — No → S960 Washer fluid cleaning system in operation? — No Yes S930 → Washer fluid cleaning system in operation? — Yes No

S940 — MODE 1

S942 → Contaminated? — No → S900

Yes

MODE 2 — S944

MODE 2 — S950

S970 — MODE 3

MODE 2 — S980

SENSOR CLEANING SYSTEM

CROSS-REFERENCE TO RELATED APPLICATION

The present application claims priority to Korean Patent Application No. 10-2023-0034442, filed on Mar. 16, 2023, the entire contents of which is incorporated herein for all purposes by this reference.

BACKGROUND OF THE PRESENT DISCLOSURE

Field of the Present Disclosure

The present disclosure relates to a sensor cleaning system, and more particularly, to a sensor cleaning system configured to clean environmental sensors of a vehicle.

Description of Related Art

Recently, a driver assistance system for assisting a driver of a vehicle is provided in a vehicle to ensure safe driving in various driving situations. In addition to the driver assistance system, research and development on autonomous vehicles that drive by themselves without a driver is ongoing.

In such a driver assistance system or autonomous vehicle, various types of environmental sensors capable of detecting surrounding environments in a variety of ways are mounted on vehicles. Environmental sensors mounted on vehicles include radio detection and ranging (RADAR), LiDAR, cameras, and the like.

Because these environmental sensors are mounted on the outside of the vehicle, detecting parts may be easily soiled by foreign substances, such as dust, rain, snow, etc. To maintain performance of the environmental sensors, these environmental sensors must be kept cleaned at a certain level, so that a sensor cleaning system configured for cleaning sensors when detecting portions are contaminated is provided in vehicles.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a sensor cleaning system configured for efficiently cleaning environmental sensors.

The objects of the present disclosure are not limited to the foregoing, and objects not mentioned herein will be able to be clearly understood from the following description by those of ordinary skill in the art to which an exemplary embodiment of the present disclosure belongs (hereinafter referred to as 'a person of ordinary skill').

To accomplish the object of the present disclosure as described above and to perform the characteristic functions of the present disclosure described later, the characteristics of the present disclosure are as follows.

A method of controlling a sensor cleaning system according to various exemplary embodiments of the present disclosure includes detecting contamination of an environmental sensor, determining a contamination source of the contamination when contamination of the environmental sensor is detected, and adjusting operation of an air cleaning system of the sensor cleaning system based on the determined contamination source.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 7 shows a flow diagram of operation of a sensor cleaning system according to various exemplary embodiments of the present disclosure:

FIG. 9 shows a flow diagram of operation of a sensor cleaning system according to various exemplary embodiments of the present disclosure.

Figure 1:
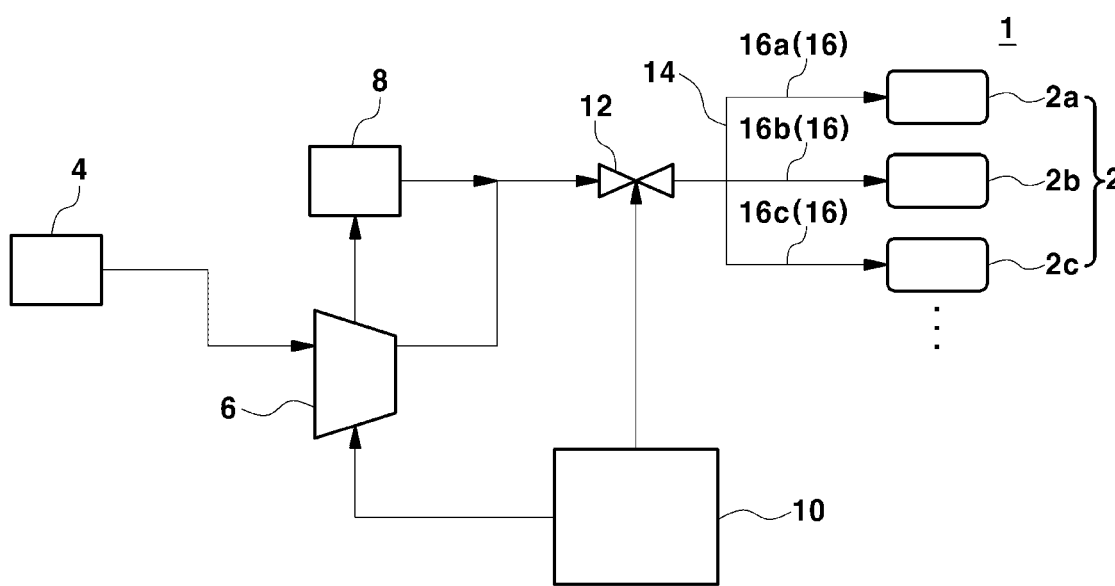
FIG. 1 shows an example of an air cleaning system for cleaning an environmental sensor of a vehicle.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions presented in the exemplary embodiments of the present disclosure are only illustrated for describing the exemplary embodiments according to the concept of the present disclosure, and embodiments according to the concept of the present disclosure may be implemented in various forms. Furthermore, the present disclosure should not be construed as being limited to the exemplary embodiments described herein, but should be understood to include all modifications, equivalents, and substitutes included in the spirit and scope of the present disclosure.

It will be understood that, although the terms "first," "second," etc., may be used herein to describe various elements, these elements are not limited by these terms. These terms are only used to distinguish one element from another element. For instance, a first element discussed below could be termed a second element without departing from the scope of the present disclosure. Similarly, the second element could also be termed the first element.

It will be understood that when an element is referred to as being "joined" or "connected" to another element, it may be directly joined or connected to the other element, or intervening elements may be present therebetween. In contrast, it should be understood that when an element is referred to as being "directly connected" or "directly coupled" to another element, there are no intervening elements present. Other expressions that explain the relationships between elements, such as "between," "directly between," "adjacent to," or "directly adjacent to," should be construed in the same way.

Throughout the specification, the same reference numerals will refer to the same or like elements. The terminology used herein is for describing the exemplary embodiments and is not intended to limit the present disclosure. As used herein, the singular forms are intended to include the plural forms as well, unless the context clearly indicates otherwise. It will be further understood that the terms "comprises" and/or "comprising" when used in the present specification specify the presence of stated elements, steps, operations, and/or devices, but do not preclude the presence or addition of one or more other elements, steps, operations, and/or devices.

Hereinafter, a detailed description will be provided of embodiments of the present disclosure with reference to the appended drawings.

As described above, to maintain performance of environmental sensors for detecting the surrounding environment of a vehicle, periodic cleaning of the surface of the sensors is required. For example, environmental sensors may be contaminated by solids, such as dust, sand, etc., or may be stained by liquids, such as raindrops, snow, etc., during rainfall.

In active autonomous vehicles, a vehicle is driven based on surrounding environment information, such as traffic lights, pedestrians, road types, buildings, surrounding vehicles, and the like, recognized by the environmental sensors. When the surface of the environmental sensors is contaminated, it is impossible to recognize the surrounding environment, and active autonomous driving becomes impossible. Therefore, the sensor cleaning system of the vehicle is configured to perform an important function of enabling driving by helping the environmental sensors to clearly perceive the surrounding environment without distortion and removing contaminants from the surface of the sensors.

Cleaning of an environmental sensor may be performed through a method using a washer fluid or high-pressure air. In the former, the sensor may be cleaned using a washer fluid, and water including the washer fluid on the sensor may be removed through air spray. In the latter, foreign substances on the sensor surface may be removed by spraying only high-pressure air.

Figure 2:
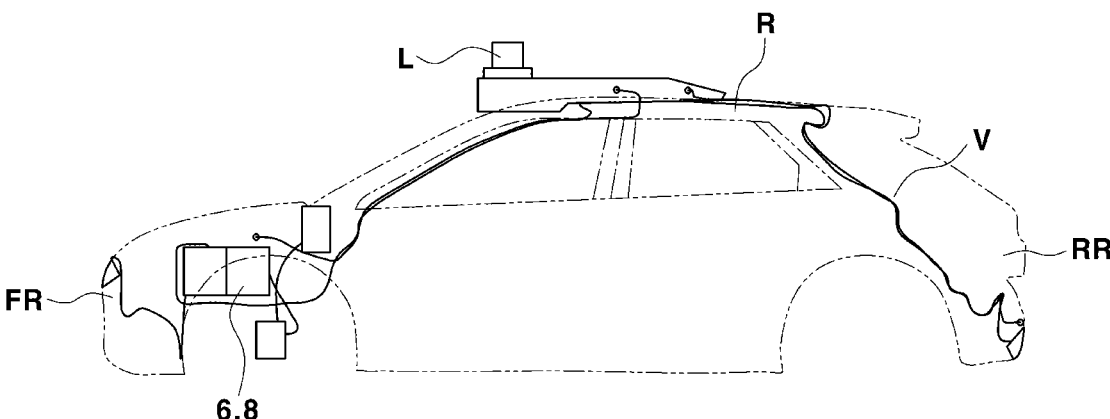
FIG. 2 schematically shows a vehicle.

As shown in FIG. 1 and FIG. 2, according to an exemplary embodiment of the present disclosure, an air cleaning system 1 using compressed air may perform cleaning by spraying compressed air onto an environmental sensor 2. The environmental sensor 2 includes a detecting device, such as LiDAR (L), radio detection and ranging (RADAR), a camera, etc., and may be disposed on a front FR, a rear RR, a side, and a roof R of the vehicle V.

Air filtered through an air filter 4 provided to the vehicle is introduced into a compressor 6. The compressor 6 may be configured to generate compressed air and store the compressed air in an air tank 8. The compressed air generated by the compressor 6 or the compressed air in the air tank 8 is sprayed onto the surface of the environmental sensor 2, removing foreign substances from the environmental sensor 2. The environmental sensor 2 includes a plurality of environmental sensors 2a, 2b, 2c, and three environmental sensors are illustrated in the drawing and specification, but the number thereof is not limited thereto and may be increased or decreased.

In the air cleaning system 1, a controller 10 is configured to open or close a valve 12 when necessary. As a non-limiting example, the valve 12 may be a solenoid valve. When the valve 12 is opened, the compressed air is sprayed from the compressor 6 or the air tank 8 to the environmental sensor 2 to clean the environmental sensor 2. The valve 12 is provided or integrally formed with a distributor 14 so that the compressed air may be dispensed via a nozzle 16 (16a, 16b, 16c) provided for the plurality of environmental sensors 2a, 2b, 2c.

The flow rate of sprayed compressed air required for cleaning may vary depending on the type and size of the environmental sensor 2. Also, even when the same environmental sensor 2 is provided, the flow rate and frequency of compressed air required for cleaning may vary depending on the type of a contamination source.

The present disclosure is directed to providing a sensor cleaning system 100 that enables efficient cleaning of the environmental sensor 2 regardless of the shape of the environmental sensor 2 or the type of the contamination source without structural change of the sensor cleaning system.

Figure 3:
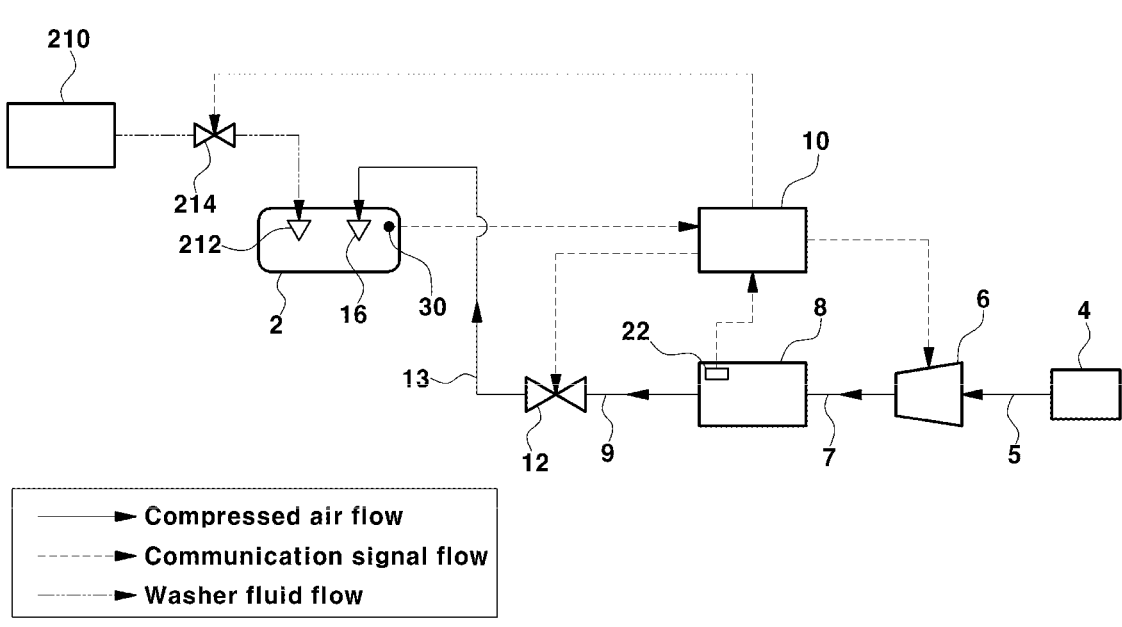
FIG. 3 shows a schematic diagram of a sensor cleaning system according to various exemplary embodiments of the present disclosure.
Figure 4:
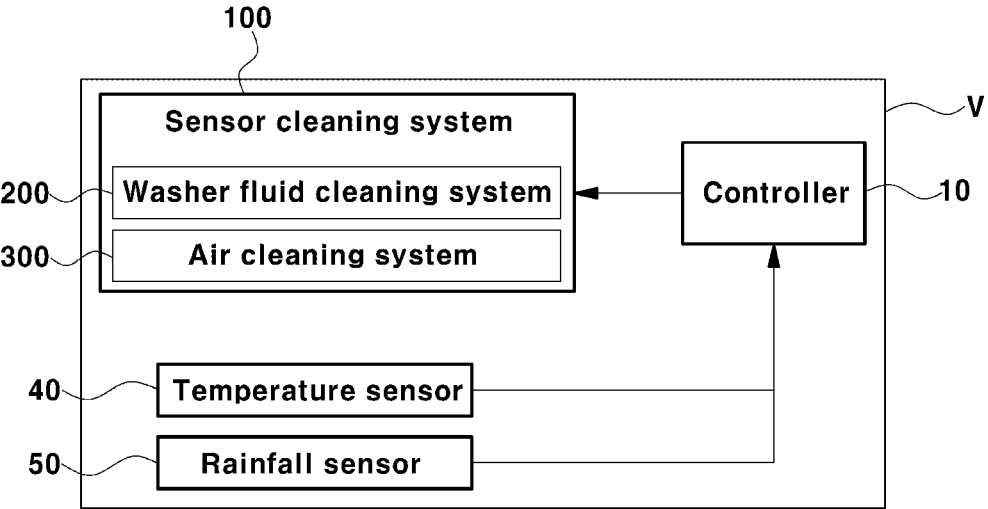
FIG. 4 shows a communication configuration of the sensor cleaning system according to various exemplary embodiments of the present disclosure.
Figure 5:
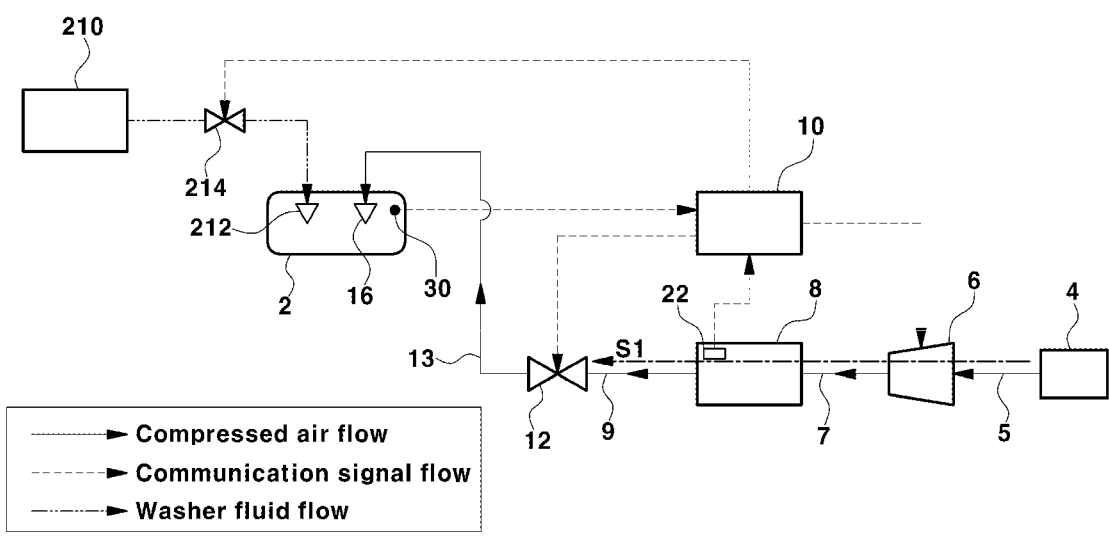
FIG. 5 shows a flow of compressed air when the sensor cleaning system according to various exemplary embodiments of the present disclosure is not in operation.

In embodiments shown in FIG. 3, FIG. 4, and FIG. 5, only one environmental sensor is provided, unlike FIG. 1, for simplicity of drawings. However, cleaning of the sensor cleaning system 100 for a plurality of environmental sensors may be performed as shown in FIG. 1.

As shown in FIG. 3 and FIG. 4, the sensor cleaning system 100 according to various exemplary embodiments of the present disclosure includes an air cleaning system 300 configured to clean an environmental sensor 2 by spraying compressed air. Also, the sensor cleaning system 100 may further include a washer fluid cleaning system 200 configured for cleaning the environmental sensor 2 with a washer fluid.

In the air cleaning system 300, the compressor 6 is configured to generate compressed air. Air is filtered through the air filter 4, and the filtered air may be directed to the compressor 6 through an entry flow path 5. The compressor 6 may be configured to generate compressed air to store the compressed air in the air tank 8. The compressor 6 and the air tank 8 are configured to fluidically communicate with each other through a first flow path 7 so that the generated compressed air may be stored in the air tank 8.

The air tank 8 is configured to store the compressed air generated by the compressor 6. The compressor 6 may operate to fill the air tank 8 so that the internal pressure of the air tank 8 may be maintained at a suitable high pressure required for cleaning, and the internal pressure of the air tank 8 may be monitored in real time. For example, a pressure sensor 22 configured for detecting the internal pressure of the air tank 8 may be provided in the air tank 8. The measured value of the pressure sensor 22 may be transmitted to a controller 10, and the controller 10 may check the internal pressure of the air tank 8.

The valve 12 allows or blocks the flow of the compressed air. The valve 12 may be disposed downstream of the air tank 8 and upstream of the environmental sensor 2 with respect to a direction of flow of the compressed air (a direction of the solid arrow). When the valve 12 is opened, the compressed air in the air tank 8 may be directed to the environmental sensor 2. The valve 12 remains normally closed, and when cleaning is required, the valve 12 is opened to move the compressed air to the nozzle 16 at the environmental sensor 2. As a non-limiting example, the valve 12 may be a solenoid valve, opening and closing of which may be controlled by the controller 10.

The nozzle 16 is configured to directly spray the compressed air onto the environmental sensor 2. The nozzle 16 is disposed around the environmental sensor 2 to directly spray the compressed air onto the environmental sensor 2. The nozzle 16 may receive the compressed air by communicating with the valve 12 through a third flow path 13.

The washer fluid cleaning system 200 may spray the washer fluid to the environmental sensor 2. The washer fluid stored in a washer fluid tank 210 may be sprayed onto the environmental sensor 2. For example, the washer fluid in the washer fluid tank 210 may be supplied to a washer fluid nozzle 212 disposed around the environmental sensor 2.

Between the washer fluid tank 210 and the washer fluid nozzle 212, an openable washer fluid valve 214 is provided. When the washer fluid valve 214 is opened, the washer fluid may be sprayed onto the environmental sensor 2 through the washer fluid nozzle 212. As a non-limiting example, the washer fluid valve 214 may be a solenoid valve, and the washer fluid valve 214 may be controlled by the controller 10. After spraying of the washer fluid by the washer fluid cleaning system 200 to the environmental sensor 2, as described above, the compressed air may be sprayed by the air cleaning system 300 to remove remaining water.

The controller 10 is configured to supervise and control operation of the sensor cleaning system 100.

The controller 10 may be configured for controlling operation of the compressor 6. For example, the compressor 6 may operate based on the internal pressure of the air tank 8 monitored by the pressure sensor 22.

Also, the controller 10 may open the valve 12 when necessary to perform air cleaning for the environmental sensor 2. For example, the controller 10 is configured to electrically communicate with a contamination detection sensor 30 that is configured to determine the degree of contamination of the environmental sensor 2. Upon determining that the environmental sensor 2 is contaminated based on the detection of the contamination detection sensor 30, the controller 10 may open the valve 12 to spray the compressed air onto the environmental sensor 2.

Moreover, the controller 10 may be configured for controlling operation of the washer fluid cleaning system 200. When contamination is detected by the contamination detection sensor 30 or when necessary, the controller 10 may open the washer fluid valve 214 to spray the washer fluid onto the environmental sensor 2.

As described above, the environmental sensor 2 may include at least one selected among a Light Detection and Ranging (LiDAR), a camera, and a radio detection and ranging (RADAR). When the compressed air is sprayed by the nozzle 16, the surface or detecting portion of the LiDAR, the camera or the radar may be cleaned.

Additionally, the controller 10 is configured to communicate with various sensors in the vehicle V. For example, the controller 10 may be configured to electrically communicate with a temperature sensor 40 of the vehicle V to collect a current outdoor temperature Tc measured by the temperature sensor 40. As an exemplary embodiment of the present disclosure, the controller 10 may communicate with a rainfall sensor 50 of the vehicle V. Based on measurement information of the rainfall sensor 50, whether or not it is currently raining may be recognized.

Figure 6:
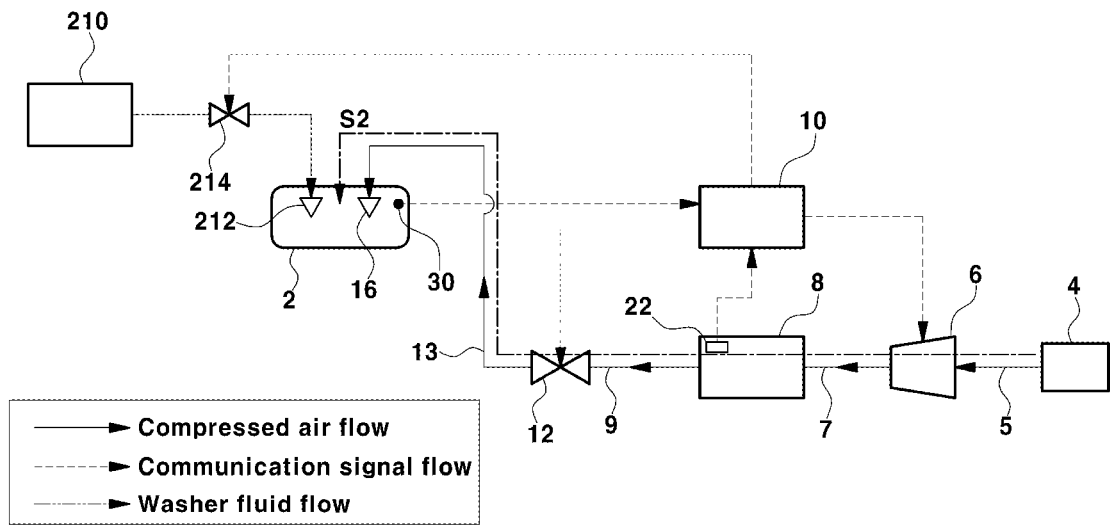
FIG. 6 shows a flow of compressed air when the sensor cleaning system according to various exemplary embodiments of the present disclosure is in operation.

The non-operation state and the operation state of the air cleaning system 300 are shown in FIG. 5 and FIG. 6.

When the air cleaning system 300 is not in operation, as shown in FIG. 5, air inside the air tank 8 is maintained at an appropriate high pressure required for cleaning. Because the valve 12 is in a closed state, systems between the upstream side and the downstream side of the valve 12 may be distinguished based on the valve 12. As indicated by S1, the compressed air, which is a working fluid, is maintained at the same pressure as the air tank 8 up to the inside of a second flow path 9 upstream of the valve 12. The air inside the third flow path 13 is maintained at the same atmospheric pressure as the outside of the vehicle V.

As shown in FIG. 6, upon determining that the surface of the sensor is contaminated, the air cleaning system 300 operates, and compressed air may flow along S2. According to the command of the controller 10, the valve 12 is opened. The compressed air inside the air tank 8 and the second flow path 9 is moved to the nozzle 16 through the third flow path 13. The compressed air is finally sprayed onto the surface of the environmental sensor 2 through the nozzle 16, and the contamination source may be removed. If the internal pressure of the air tank 8 becomes lower than a minimum pressure in the appropriate high-pressure section as the air cleaning system 300 continuously operates, the compressor 6 introduces air from the outside of the vehicle to raise the internal pressure of the air tank 8 to high pressure until the internal pressure of the air tank 8 reaches a maximum pressure in the appropriate high-pressure section for cleaning. The controller 10 may be configured to determine whether the internal pressure of the air tank 8 needs to be increased based on the measured value of the pressure sensor 22.

When contamination of the environmental sensor 2 is detected, the sensor cleaning system 100 according to an exemplary embodiment of the present disclosure may be configured for controlling spraying conditions, such as time to maintain the opening of the valve 12, the number of times the valve 12 is opened per hour, etc., depending on the type of contamination source, making it possible to perform cleaning more efficiently by selectively applying the spray flow rate for each contamination source.

For example, when the contamination source of the environmental sensor 2 is classified into water, washer fluid, and other substances, the air cleaning system 300 may perform cleaning under spraying conditions suitable for respective cases. Accordingly, the contamination source may be detected by being classified into solid and liquid, the liquid being divided into water and washer fluid.

With reference to FIG. 7, the sensor cleaning system 100 starts at S700. The sensor cleaning system 100 may start when the vehicle V is turned on and then continuously monitor whether the environmental sensor 2 is contaminated.

At S710, whether the environmental sensor 2 is contaminated is determined. The controller 10 may be configured to determine whether the environmental sensor is contaminated in response to a signal from the contamination detection sensor 30. Upon determining that the environmental sensor 2 is contaminated, the controller 10 may perform cleaning.

The controller 10 may first perform a preset determination for determining a spray flow rate required per cleaning. At S720, the controller 10 is configured to determine whether the washer fluid cleaning system 200 has been in operation. As described above, the present step is to determine whether the washer fluid remains on the environmental sensor 2 because the air cleaning system 300 may operate to remove the washer fluid remaining on the environmental sensor 2 after operation of the washer fluid cleaning system 200. For example, the controller 10 may be configured to determine that the washer fluid cleaning system 200 has been in operation based on which the washer fluid cleaning system 200 is in operation within a predetermined time period from the current point in time.

Depending on whether the washer fluid cleaning system 200 is in operation, the controller 10 is configured to determine a temperature condition and a rainfall condition.

Upon determining at S720 that the washer fluid cleaning system 200 has not been in operation, the controller 10 is configured to determine the rainfall condition at S730. Upon determining that it is currently raining based on the input of the rainfall sensor 50, the controller 10 is configured to perform cleaning in mode 1 or a first mode at S740. On the other hand, upon determining that it is not currently raining, the controller 10 is configured to perform cleaning in mode 2 or a second mode (S750).

In contrast, upon determining at S720 that the washer fluid cleaning system 200 has been in operation, the controller 10 is configured to determine whether the current outdoor temperature Tc is above zero, namely 0° C. or higher at S760. Upon determining that the current outdoor temperature Tc is 0° C. or higher, the controller 10 is configured to perform cleaning in mode 2 at S770. On the other hand, upon determining that the current outdoor temperature Tc is lower than 0° C., the controller 10 is configured to perform cleaning in mode 3 at S780.

Mode 1 corresponds to a cleaning mode performed upon determining that the environmental sensor 2 is contaminated by water such as rainwater, etc. Because mode 1 is not a case in which the contamination source is not well removed, the spray time of compressed air is set to the lowest. Also, the spray time may be adjusted depending on the current internal pressure of the air tank 8 during execution of mode 1. When the internal pressure of the air tank 8 is low, the spray time may be increased, whereas when the internal pressure of the air tank 8 is high, the spray time may be decreased.

Mode 2 corresponds to a case in which there is no possibility of freezing and the washer fluid remains. Also, mode 2 may be executed to remove other foreign substances when the washer fluid does not remain and it is not raining. In an exemplary embodiment of the present disclosure, it is determined that the spraying condition when only the washer fluid remains without the possibility of freezing is the same as the spraying condition for removing other foreign substances. Here, the spray flow rate is set to be greater compared to cleaning in mode 1, which is contamination by water. In mode 2, the compressed air is set to be sprayed for a shorter time compared to mode 3 and for a longer time compared to mode 1. In mode 2 as in mode 1, the spray time may be adjusted depending on the current internal pressure of the air tank 8.

Mode 3 corresponds to a case in which there is a possibility of freezing and the washer fluid remains. Accordingly, because mode 3 corresponds to the case in which the degree of contamination is the severest, the longest spray time is set in mode 3 among cleaning modes. In mode 3, as well, the spray time may also be adjusted depending on the current internal pressure of the air tank 8.

Illustratively, the spray time for each mode may be set as shown in Tables 1 to 3 below. In Table 2, a difference in the spray time between environmental sensor #1 and environmental sensor #2 means that spraying conditions may be changed depending on the shape or size of the environmental sensor.

TABLE 1

| MODE 1 | | |
|---|---|---|
| Air tank pressure | Spray time (millisecond) | |
| (bar) | Environmental sensor #1 | Environmental sensor #2 |
| 7-8 | 50 | 50 |
| 8-9 | 40 | 40 |
| 9-10 | 30 | 30 |

TABLE 2

| MODE 2 | | |
|---|---|---|
| Air tank pressure | Spray time (millisecond) | |
| (bar) | Environmental sensor #1 | Environmental sensor #2 |
| 7-8 | 100 | 120 |
| 8-9 | 90 | 100 |
| 9-10 | 80 | 90 |

TABLE 3

| MODE 3 | | |
|---|---|---|
| Air tank pressure | Spray time (millisecond) | |
| (bar) | Environmental sensor #1 | Environmental sensor #2 |
| 7-8 | 500 | 650 |
| 8-9 | 450 | 600 |
| 9-10 | 400 | 550 |

The values described in Tables 1 to 3 are exemplary, and it will be obvious to those skilled in the art that the spray time may be set differently depending on the shape or size of the surface of the environmental sensor, how the surface of the environmental sensor is treated, etc.

Figure 8:
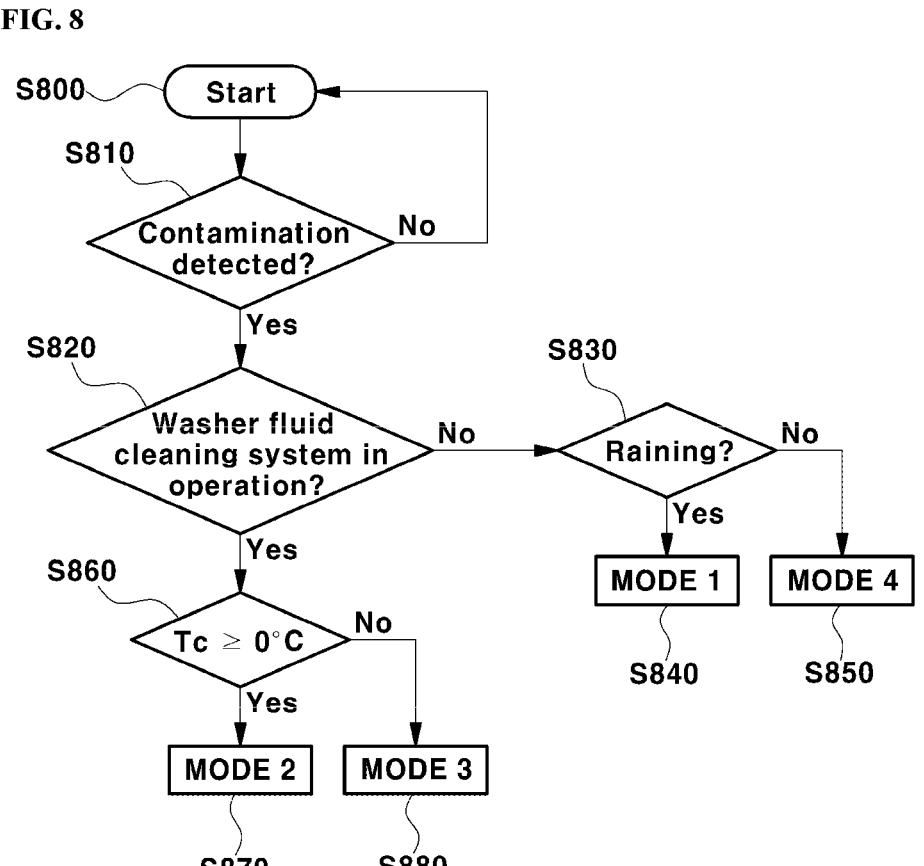
FIG. 8 shows a flow diagram of operation of a sensor cleaning system according to various exemplary embodiments of the present disclosure.

The exemplary embodiment shown in FIG. 8 is almost the same as the exemplary embodiment shown in FIG. 7. However, in the exemplary embodiment of FIG. 7, cleaning of the washer fluid remaining on the environmental sensor 2 at a temperature of 0° C. or higher and cleaning of other foreign substances are identically implemented, and thus, cleaning is performed in mode 2 in respective cases. The exemplary embodiment of FIG. 8 is different in that mode 4 in which separate spraying conditions are applied for cleaning of other foreign substances is provided. In the mode 4 in which the contamination source is solid, the flow rate of the compressed air which is sprayed onto the environmental sensor by the air cleaning system is greater in the mode 4 than mode 3. Examples of other foreign substances than water and washer fluid may include human saliva, fallen leaves, eggs, etc. Assume that a flow rate of the compressed air required to remove the above-mentioned other foreign substances is different from a flow rate of the compressed air required to remove water or washer fluid. In this case, a new mode with a different spray time, i.e., mode 4 may be added to remove the example foreign substances instead of modes 1, 2, and 3 where water or the washer fluid is cleaned. FIG. 8 shows the above embodiment.

FIG. 9 shows a flow diagram for an exemplary embodiment that does not consider the measured value by the rainfall sensor 50. The contamination source may be determined without the detecting result of the rainfall sensor 50 and cleaning may be performed in accordance. Here, S900 and S910 correspond to S700 and S710, respectively.

In S920, it is determined whether the current outdoor temperature Tc is 0° C. or higher. Then it is determined whether the washer fluid cleaning system 200 has been in operation depending on the outdoor temperature.

When the temperature is 0° C. or higher than the 0° C. but the washer fluid cleaning system is not in operation at S930, the controller 10 is configured to perform cleaning in mode 1 (S940). Here, the contamination source of the environmental sensor 2 is determined to be water. In the instant case, however, there is a possibility that the contamination source is a foreign substance rather than water, and the contamination source may not be removed even by cleaning in mode 1. Therefore, upon determining that contamination of the environmental sensor 2 is not removed at S942 after cleaning in mode 1, the controller 10 is configured to perform cleaning in mode 2 again at S944. This is because the spray flow rate of compressed air required when removing water is less than the spray flow rate required when removing other foreign substances. However, when a smaller air flow rate is required when removing other foreign substances, the cleaning order may be changed by spraying under conditions of mode 1 through S942 after cleaning in mode 2.

Upon determining that the temperature is 0° C. or higher than the 0° C. and the washer fluid cleaning system has been in operation at S930, the controller 10 is configured to perform cleaning in mode 2 (S950).

On the other hand, when the current outdoor temperature Tc is less than 0° C. and the washer fluid cleaning system 200 has not been in operation, the controller 10 may perform cleaning in mode 3 at S960 and S970.

In contrast, when the current outdoor temperature Tc is less than 0° C. but the washer fluid cleaning system 200 has not been in operation, the controller 10 may perform cleaning in mode 2 (S960, S980).

Although not shown in FIG. 3, the sensor cleaning system 100 according to an exemplary embodiment of the present disclosure may further include the distributor 14 to enable cleaning of the plurality of environmental sensors 2.

As is apparent from the above description, according to an exemplary embodiment of the present disclosure, a sensor cleaning system configured for efficiently cleaning environmental sensors is provided.

The effects of the present disclosure are not limited to the above-mentioned effects. It should be understood that the effects of the present disclosure include all effects which may be inferred from the description of the present disclosure.

Furthermore, the term related to a control device such as "controller", "control apparatus", "control unit", "control device", "control module", or "server", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling a sensor cleaning system controllable by a controller, the method comprising:
   detecting, by the controller, contamination of an environmental sensor;
   determining, by the controller, a contamination source of the contamination in response that the contamination of the environmental sensor is detected; and
   adjusting, by the controller, operation of an air cleaning system of the sensor cleaning system based on the determined contamination source, wherein the operation of the air cleaning system is adjusted based on whether a washer fluid cleaning system has been in operation and an outdoor temperature.

2. The method of claim 1, wherein the determining of the contamination source includes determining on whether the washer fluid cleaning system has been in operation or whether rain is falling.

3. The method of claim 2, wherein the washer fluid cleaning system includes:
   a washer fluid tank configured to store a washer fluid;
   an openable washer fluid valve configured to direct the washer fluid to the environmental sensor; and
   a washer fluid nozzle configured to spray the directed washer fluid onto the environmental sensor.

4. The method of claim 1, wherein the air cleaning system is controlled so that:
   the air cleaning system operates in a first mode based on determining that the contamination is caused by rainfall;
   the air cleaning system operates in a second mode based on determining that the contamination source is solid or based on determining that the contamination source is a washer fluid and the outdoor temperature is 0° C. or higher than the 0° C.; or
   the air cleaning system operates in a third mode based on determining that the contamination source is the washer fluid and the outdoor temperature is less than 0° C.,
   wherein a flow rate of compressed air which is sprayed onto the environmental sensor by the air cleaning system is greater in the second mode than in the first mode, and greater in the third mode than in the second mode.

5. The method of claim 1, wherein the air cleaning system is controlled so that:
   the air cleaning system operates in a first mode based on determining that the contamination is caused by rainfall;
   the air cleaning system operates in a second mode based on determining that the contamination source is a washer fluid and the outdoor temperature is 0° C. or higher than the 0° C.;
   the air cleaning system operates in a third mode based on determining that the contamination source is the washer fluid and the outdoor temperature is less than 0° C.; or
   the air cleaning system operates in a fourth mode based on determining that the contamination source is solid,
   wherein a flow rate of compressed air which is sprayed onto the environmental sensor by the air cleaning system is greater in the second mode than in the first mode, greater in the third mode than in the second mode, and greater in the fourth mode than in the third mode.

6. The method of claim 1, wherein the air cleaning system is controlled so that:
   the air cleaning system operates in a first mode based on determining that the outdoor temperature is 0° C. or higher than the 0° C. and the contamination source is not a washer fluid;
   the air cleaning system operates in a second mode based on determining that the outdoor temperature is 0° C. or higher than the 0° C. and the contamination source is the washer fluid or based on determining that the outdoor temperature is less than 0° C. and the contamination source is not the washer fluid; or
   the air cleaning system operates in a third mode based on determining that the outdoor temperature is less than 0° C. and the contamination source is the washer fluid,
   wherein a flow rate of compressed air which is sprayed onto the environmental sensor by the air cleaning system is greater in the second mode than in the first mode, and greater in the third mode than in the second mode.

7. The method of claim 6, further including:

detecting, by the controller, the contamination of the environmental sensor again after operation in the first mode; and allowing, by the controller, the air cleaning system to operate in the second mode when based on the contamination being detected.

8. The method of claim 1, wherein the operation of the air cleaning system is adjusted by the controller, by controlling a spray flow rate of compressed air in the air cleaning system, to be sprayed onto the environmental sensor.

9. The method of claim 8, wherein the spray flow rate is adjusted based on an internal pressure of an air tank of the air cleaning system, in which the compressed air is stored.

10. The method of claim 1, wherein the determining of the contamination source includes determining whether the washer fluid cleaning system of the sensor cleaning system has been in operation, and wherein the air cleaning system is controlled to operate in different modes depending on whether the washer fluid cleaning system has been in operation.

11. The method of claim 10, wherein the determining of the contamination source further includes determining whether rain is currently falling when based on determining that the washer fluid cleaning system has not been in operation.

12. The method of claim 11, wherein the adjusting of the operation of the air cleaning system includes allowing the air cleaning system to operate in a first mode based on determining that the rain is currently falling.

13. The method of claim 11, wherein the adjusting of the operation of the air cleaning system includes allowing the air cleaning system to operate in a second mode based on determining that the rain is not currently falling.

14. The method of claim 10, wherein the determining of the contamination source further includes determining whether the outdoor temperature is 0° C. or higher than the 0° C. in response to determining that the washer fluid cleaning system has been in operation.

15. The method of claim 14, wherein the adjusting of the operation of the air cleaning system includes allowing the air cleaning system to operate in a second mode in response to the determining that the outdoor temperature is 0° C. or higher than the 0° C.

16. The method of claim 14, wherein the adjusting of the operation of the air cleaning system includes allowing the air cleaning system to operate in a third mode in response to determining that the outdoor temperature is less than 0° C.

17. The method of claim 1, wherein the contamination of the environmental sensor is detected by the controller by use of a contamination detection sensor disposed at the environmental sensor.

18. The method of claim 1, wherein the air cleaning system includes:

a compressor configured to generate compressed air by drawing in air therein;

an air tank connected to the compressor and configured to store the generated compressed air;

an openable valve configured to direct the compressed air to the environmental sensor; and a nozzle configured to spray the directed compressed air onto the environmental sensor.

19. The method of claim 1, wherein the environmental sensor includes at least one or more of a Light Detection and Ranging (LiDAR), a camera, and a radio detection and ranging (RADAR) configured to detect a surrounding environment of a vehicle.

* * * * *